United States Patent [19]

Harman et al.

[11] Patent Number: 5,717,813
[45] Date of Patent: Feb. 10, 1998

[54] FUSION SPLICE ELEMENT FOR USE IN SPLICING OPTICAL FIBERS

[75] Inventors: Murray R. Harman, Gloucester; James D. Marshall, Stittsville; Gordon A. Clark, Nepean, all of Canada

[73] Assignee: Fiberlign a division of Preformed Line Products (Canada) Ltd., Nepean, Canada

[21] Appl. No.: 632,711

[22] Filed: Apr. 15, 1996

Related U.S. Application Data

[63] Continuation of Ser. No. 289,293, Aug. 11, 1994, abandoned, which is a continuation-in-part of Ser. No. 289,200, Aug. 11, 1994, which is a continuation-in-part of Ser. No. 266,205, Jun. 27, 1994, Pat. No. 5,596,672, and a continuation-in-part of Ser. No. 289,291, Aug. 11, 1994, Pat. No. 5,481,640, which is a continuation-in-part of Ser. No. 266, 205, Jun. 27, 1994.

[51] Int. Cl.⁶ .................................... G02B 6/255
[52] U.S. Cl. ................ 385/147; 385/96; 385/137; 219/383; 65/501
[58] Field of Search ............... 385/147, 136, 385/137, 95–99, 33, 36, 41, 42; 219/383, 121.11, 121.12; 65/509, 501, 407, 152

[56] References Cited

U.S. PATENT DOCUMENTS

| | | | |
|---|---|---|---|
| 4,033,668 | 7/1977 | Presby | 385/95 |
| 4,049,414 | 9/1977 | Smith | 65/407 |
| 4,152,190 | 5/1979 | Kurosawa et al. | 156/366 |
| 4,199,223 | 4/1980 | Yannoni | 385/134 |
| 4,220,394 | 9/1980 | Tardy | 385/64 |
| 4,266,852 | 5/1981 | Higgins et al. | 385/96 |
| 4,274,707 | 6/1981 | Pacey et al. | 385/139 |
| 4,326,870 | 4/1982 | Bendit et al. | 65/407 |
| 4,350,867 | 9/1982 | Kinoshita et al. | 219/121.63 |
| 4,416,506 | 11/1983 | Johnson et al. | 385/137 |
| 4,423,923 | 1/1984 | Frazier et al. | 385/45 |
| 4,433,896 | 2/1984 | Frazier | 385/51 |
| 4,487,475 | 12/1984 | Ogawa | 385/95 |
| 4,537,468 | 8/1985 | Degoix et al. | 385/96 |
| 4,548,669 | 10/1985 | Steinmann et al. | 156/358 |
| 4,557,557 | 12/1985 | Gleason et al. | 385/140 |
| 4,561,719 | 12/1985 | Quan | 385/98 |
| 4,662,962 | 5/1987 | Malavielle | 156/158 |
| 4,664,732 | 5/1987 | Campbell et al. | 156/158 |
| 4,687,287 | 8/1987 | Lukas et al. | 385/134 |
| 4,695,306 | 9/1987 | Kakoun et al. | 65/152 |

(List continued on next page.)

FOREIGN PATENT DOCUMENTS

| | | |
|---|---|---|
| 0 458 609 A1 | 11/1991 | European Pat. Off. . |
| 0 568 382 A2 | 11/1993 | European Pat. Off. . |
| 41 12 089 A1 | 10/1992 | Germany . |
| 53-149655 | 5/1978 | Japan . |
| 59-115 | 4/1984 | Japan . |
| 61-2107 | 5/1986 | Japan . |
| 61-145507 | 11/1986 | Japan . |

OTHER PUBLICATIONS

"Arc-fusion Splicing of Single Mode Fibers 2: A Practical Splice Machine", Applied Optics, vol. 21, No. 11, Jun. 1, 1982.

"Fusion Splices for Single-Mode Optical Fibers", IEEE Journal of Quantum Electronices, vol. QE-14, No. 8, Aug. 1978.

*Primary Examiner*—Phan T. H. Palmer
*Attorney, Agent, or Firm*—Fay, Sharpe, Beall, Fagan, Minnich & McKee

[57] ABSTRACT

An optical fiber splice element is provided that includes a base member having a fusion element for aligning optical fibers for fusion within. A covering member is provided for covering and forming an enclosure with the base member in a closed position. The covering member can be a separate member or alternatively can be in the form of a hinged lid. At lease one of the covering member and the base member include a locking mechanism for maintaining closure in a closed position. The optical fiber splice element in an open position has an opening at either end for accommodating one or more optical fibers.

14 Claims, 3 Drawing Sheets

U.S. PATENT DOCUMENTS

| | | | |
|---|---|---|---|
| 4,727,237 | 2/1988 | Schantz | 219/121.63 |
| 4,735,481 | 4/1988 | Lukas et al. | 385/139 |
| 4,736,632 | 4/1988 | Case | 73/827 |
| 4,758,061 | 7/1988 | Horn | 385/62 |
| 4,810,054 | 3/1989 | Shinbori et al. | 385/96 |
| 4,832,438 | 5/1989 | Engel et al. | 385/63 |
| 4,877,303 | 10/1989 | Caldwell et al. | 385/65 |
| 4,906,810 | 3/1990 | Sharma et al. | 219/121.46 |
| 4,920,366 | 4/1990 | Bowen et al. | 385/55 |
| 4,964,688 | 10/1990 | Caldwell et al. | 385/66 |
| 4,964,689 | 10/1990 | Wichansky | 385/66 |
| 4,969,705 | 11/1990 | Stoy et al. | 385/96 |
| 5,002,351 | 3/1991 | Szanto et al. | 385/96 |
| 5,134,470 | 7/1992 | Ravetti | 385/98 |
| 5,481,640 | 1/1996 | Harman et al. | 385/147 |

FUSION SPLICE ELEMENT FOR USE IN SPLICING OPTICAL FIBERS

CROSS-REFERENCE TO RELATED APPLICATIONS

This application is a continuation of U.S. Ser. No. 08/289,293 (filed Aug. 11, 1994) (now abandoned) which is related to, and a continuation-in-part application of, application Ser. No. 08/289,200 filed Aug. 11, 1994 entitled: FUSION SPLICING BLOCK which was a continuation-in-part application of application Ser. No. 08/266,205, filed Jun. 27, 1994 now U.S. Pat. No. 5,596,672 and is also related to, and a continuation-in-part application of, application Ser. No. 08/289,291 (now U.S. Pat. No. 5,481,640) filed Aug. 11, 1994 entitled TOOL FOR FUSING OPTICAL FIBERS which was a continuation-in-part application of application Ser. No. 08/266,205, filed Jun. 27, 1994.

FIELD OF THE INVENTION

This invention relates generally to a fusion element and more particularly to an element for use in splicing optical fibers.

BACKGROUND OF THE INVENTION

Fusion splicing devices have been well known for some time and many of these devices are commercially available. One such device is described by the applicant in U.S. Pat. No. 5,002,351 issued Mar. 26, 1991 entitled Splicer for Optical Fibers. Another such device is described in U.S. Pat. No. 5,146,527 in the name of Mallinson issued Sep. 8, 1992. Mallinson's fusion splicer is designed to receive a consumable ferrule, having a bore through a central longitudinal axis, for accommodating two fiber ends for fusion within. A slot is formed in the ferrule into which permanent electrodes are temporarily inserted for fusing optical fibers positioned within the bore.

U.S. Pat. No. 4,598,974 issued Jul. 8, 1986 in the name of Munn et al. describes an optical fiber connector having integral electrodes. Although Munn's device relates specifically to a connector having a pre-inserted optical fiber stub, it is possible to adapt this design to a fusion sleeve for fusing two unclad optical fiber ends.

Another more recently issued U.S. patent, U.S. Pat. No. 5,222,171 issued Jun. 22, 1993 in the name of Straus, describes a sleeve similar to Munn's having integral electrodes and axial alignment means.

Although the devices described in the aforementioned patents appear to adequately perform their intended functions, it is an object of this invention to provide a fusion splice element that forms an enclosure over fused optical fibers housed within. Such a fusion element would provide a relatively clean fusion cavity in which fusion may take place. In addition, the fibers need not be inserted into a guide hole where debris could come into contact with the end of the fiber, thus causing degradation of the fusion joint. The fibers instead can be placed into an alignment groove and remain clean. After fusion, the splice element is closed upon the fused optical fibers and remains with the spliced fused fibers providing a rigid support and strain relief for the fusion joint within. The fused fibers within the splice element remain in a clean protective environment. Alternatively, as will be described in greater detail, fusion may take place within a closed fusion element after a base portion and lid are sealed closed.

In accordance with the invention, an optical fiber splice element is provided comprising a base member having a fusion element for housing optical fibers for fusion within; and, a covering member for covering and forming an enclosure with the base member in a closed portion, at least one of the covering member and the base member having means for preserving closure in a closed position, the optical fiber enclosure in an open position having a channel at either end for accommodating one or more optical fibers.

BRIEF DESCRIPTION OF THE DRAWINGS

Exemplary embodiments of the invention will now be described in conjunction with the drawings in which.

DETAILED DESCRIPTION

Figure 1:
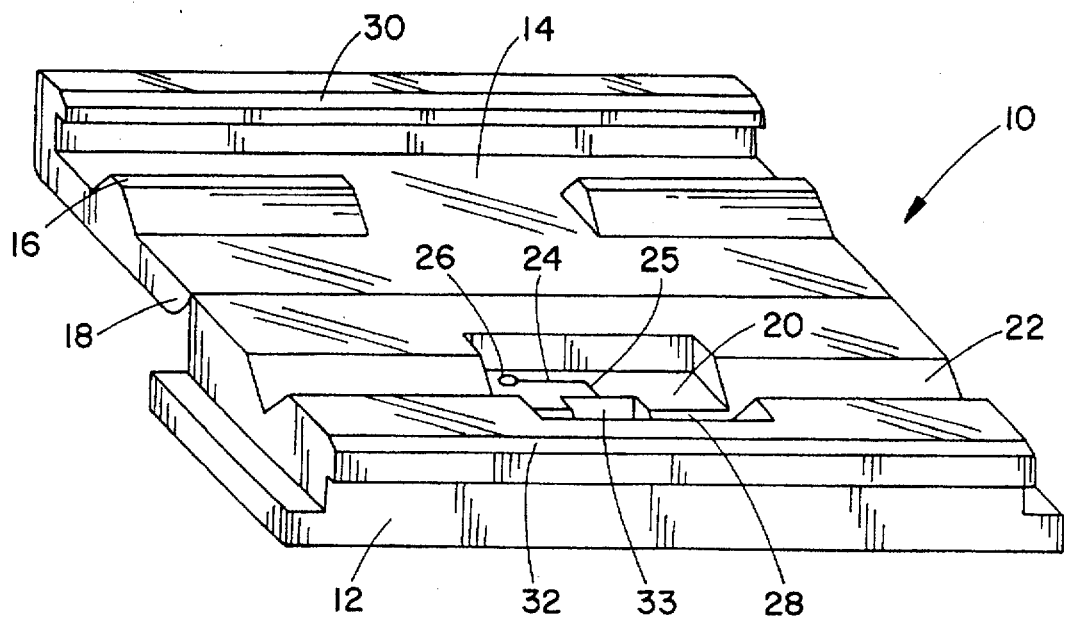
FIG. 1 is an oblique view of a splice sleeve having a built-in ceramic fusion block.
Figure 2:
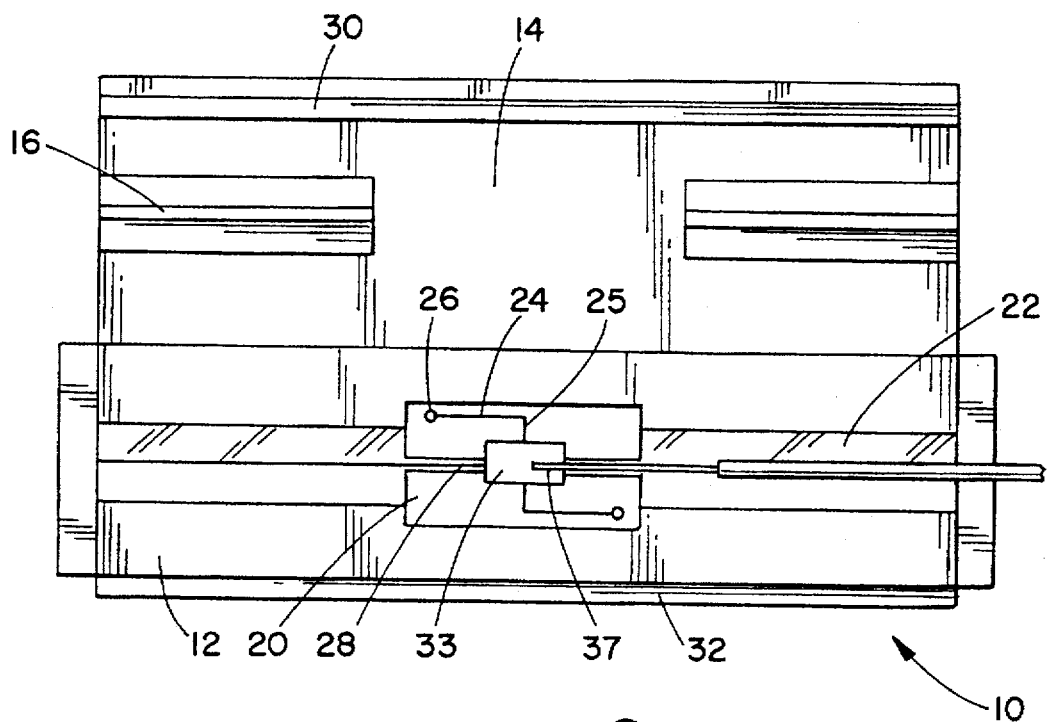
FIG. 2 is a top view of the splice sleeve shown in FIG. 1 including an optical fiber inserted in one end.

Referring now to FIG. 1 and FIG. 2, an optical fiber splicing element is shown in the form of a "butterfly" splice sleeve 10. A base portion 12 of the sleeve 10 is hingedly connected to a covering member in the form of a lid 14. A fusion member shown as a ceramic block 20 is located centrally within the base portion 12 of the sleeve 10. Two conductive copper tracks 24 are each electrically connected by a copper plated barrel of a through hole 26 to a conducting pad (not shown) on the underside of the ceramic block 20. The copper tracks 24 can be bonded to the ceramic block 20 by being printed, glued, or plated thereon. The end 25 of each copper track 24 forms an electrode. A V-groove is provided in the splicing element for guiding the optical fiber in an alignment groove 28 in the ceramic block 20. When the lid 14 is closed on the base portion 12, holding means shown as protrusions 16 in the lid abut and hold optical fibers securely within the groove(s) or channel(s) 22. The protrusions 16 are somewhat compliant and preferably resilient so that they form around the fibers and tightly squeeze the fibers without damaging them, yet at the same time, provide clamping upon the fibers serving as a strain relief for a fusion joint within the sleeve 10. An outer lip 30 on the lid 14 provides a means of securing, or latching, the lid in a closed position as it engages the underside of lip 32 on the base portion 12 of the sleeve 10, the lips providing a latch assembly. Alternatively, or even in addition to lips 30, 32, adhesive can be suitably applied on the cover and/or lid to maintain the lid in a closed position.

In operation, two optical fibers (not shown) are placed into the base portion so that their ends hang over the opening 33 in the ceramic block 20. In FIG. 2, one optical fiber 37 is shown inserted. After the fibers are in place and are ready to be fused, a sufficiently large voltage is applied across the conducting pads (not shown) to generate an electric arc across the tips of electrodes 25 so, as to melt and fuse the ends of the fibers together. The lid 14 is then closed to secure and retain the fused fibers within the splicing element 10. Alternatively, the fibers could be placed into the base portion 12, ready for fusion with the lid 14 being closed to retain the fibers. An electric arc could then be generated across the electrode tips to cause the fiber ends to fuse together. In such an embodiment, it may be preferable to provide a transparent window over the cavity defined by the region above the ceramic block. In either case, a piece of removable tape can be provided that normally covers the groove 22 and the ceramic block 20 before optical fibers are placed within. The removable tape is provided to ensure cleanliness of the groove and the ceramic block during storage and handling.

Figure 3:
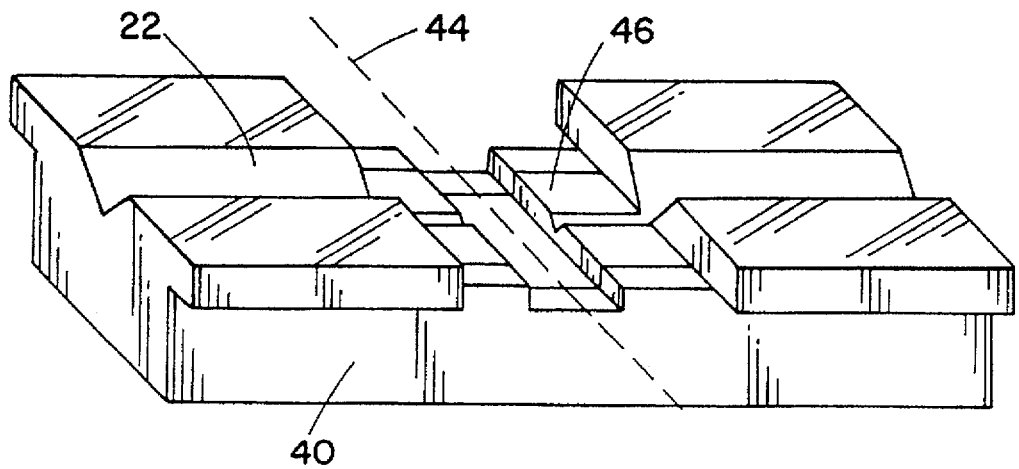
FIG. 3 is an oblique view of the base portion of an alternative embodiment of a splice sleeve.

Turning now to FIG. 3, an alternative embodiment of a fusion sleeve is shown. A base member 40 includes an optical fiber channel guide on each side of a passline 44 indicated by a dotted line. The passline 44 defines an access path for external electrodes for fusing optical fibers supported by the base member 40. A ceramic alignment block 46 is provided for supporting unclad portions of the optical fiber ends that are to be fused.

Figure 4:
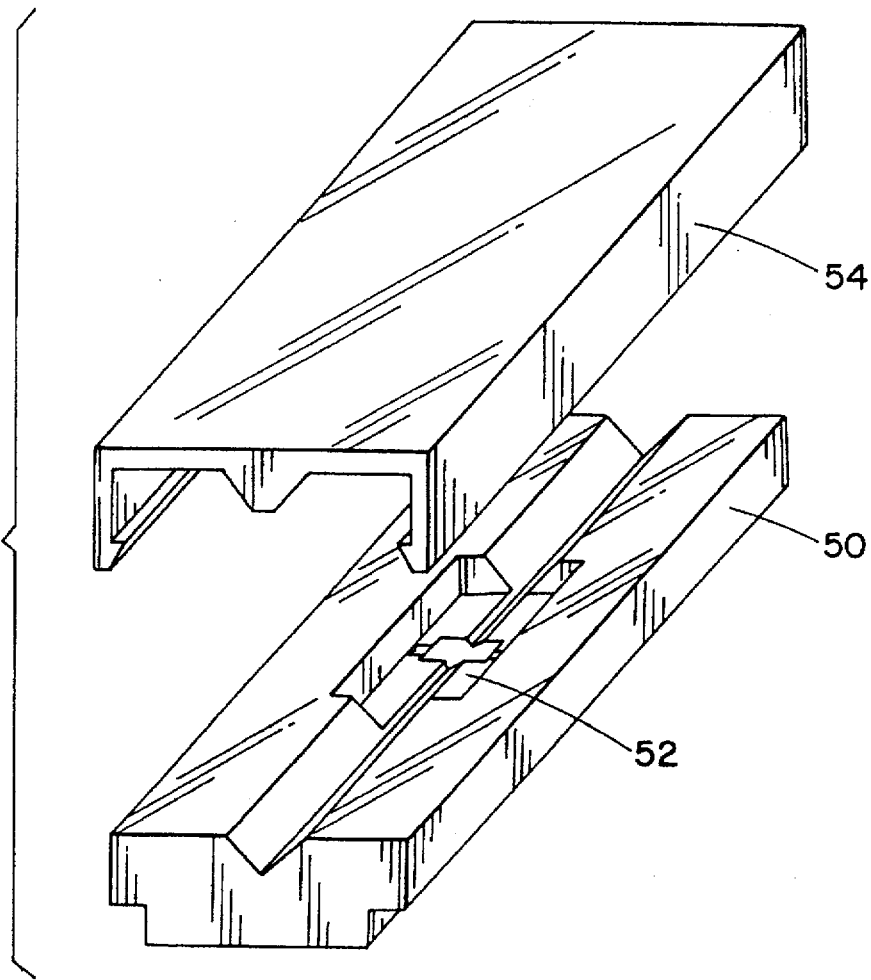
FIG. 4 is an oblique view of a splice sleeve having a separate base and lid; and, FIG. 5a and 5b are oblique views of splice sleeves each having hinged lids with multiple sections.

In FIG. 4, a splice sleeve is shown having a base member 50 and separate lid 54. The base member 50 contains a ceramic block 52 for supporting optical fibers that are to be fused. After fusion takes place the lid 54 is secured to the base member 50 for covering and protecting fused fibers within.

Figure 5A:
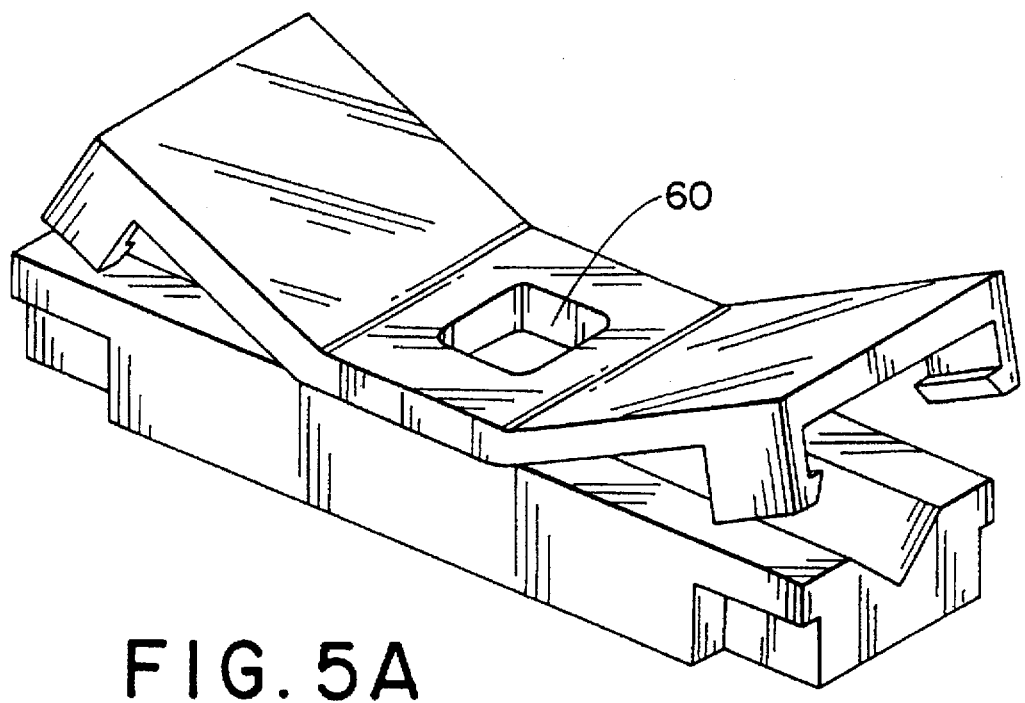
Figure 5B:
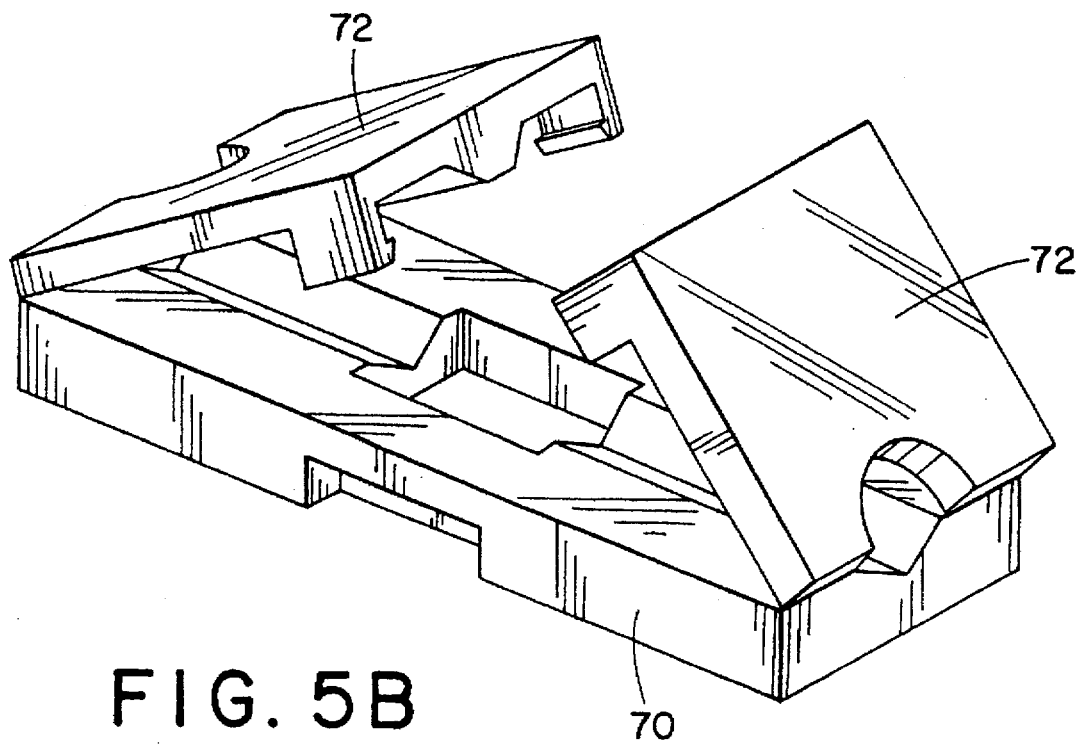

FIGS. 5a and 5b show alternative hinged lid arrangements. In FIG. 5a, a sealed port 60 is shown in the central fusion portion of the sleeve for viewing of the fusion cavity within. In FIG. 5b, a sleeve is shown having a base 70 that includes two lids 72 hinged at ends of the base 70.

Of course, numerous other embodiments may be envisaged, without departing from the spirit and scope of the invention.

What I claim is:

1. An optical fiber splice element comprising:

a base member for aligning optical fibers for fusion within, the base member having located therewithin a fusion element; and, a covering member for covering and forming an enclosure with the base member in a closed position to provide a rigid support and strain relief for fused optical fibers, at least one of the covering member and the base member having means for maintaining closure in the closed position, the optical fiber splice element in an open position having a channel at either end for accommodating one or more optical fibers and the covering member including protrusions extending therefrom and at least partially extending into the channels when the enclosure is in the closed position.

2. The optical fiber splice element as set forth in claim 1, wherein the fusion element is comprised of a non-conducting substrate and includes:

a pair of electrodes, each electrode having an electrode tip end and having another end for contacting a voltage source, a portion of each electrode overlying a surface of the non-conducting substrate, and spaced apart and separated from each other by a passline such that each electrode tip end is adjacent to the passline, the electrode tips defining an arc region therebetween.

3. The optical fiber splice element as set forth in claim 2, wherein the surface of the non-conducting substrate is substantially planar.

4. The optical fiber splice element as set forth in claim 3, wherein a portion of the electrode overlying the surface of the non-conducting substrate is bonded to the substrate.

5. The optical fiber splice element as set forth in claim 4, wherein the electrodes are printed, glued, or plated thereon.

6. The optical fiber splice element as set forth in claim 4, further comprising a layer of non-conducting material substantially covering the electrodes bonded to the non-conducting substrate.

7. The optical fiber splice element as set forth in claim 1, wherein the protrusions are at least partially resilient.

8. The optical fiber splice element as set forth in claim 1, wherein the covering member includes a viewing port for viewing optical fiber ends contained within the enclosure.

9. The optical fiber splice element as set forth in claim 1, wherein the fusion element is made of a ceramic material.

10. The optical fiber splice element as set forth in claim 1, wherein the fusion element includes electrodes.

11. The optical fiber splice element as set forth in claim 1, wherein the base member and the covering member are hingedly attached.

12. The optical fiber splice element as set forth in claim 1, wherein the means for maintaining closure in the closed position comprises cooperating lips on the covering member and the base member.

13. An optical fiber splice element comprising:

a base member having an integral fusion element for housing optical fibers for fusion within, the fusion element having electrodes bonded thereto; and a hinged covering member for covering and forming a permanent enclosure with the base member in a closed position, at least one of the covering member and the base member having means for maintaining closure in the closed position, the optical fiber splice element in an open position having an opening at either end for accommodating one or more optical fibers, the fusion element being comprised of a non-conducting substrate, the electrodes having ends defining tips that are separated to define a fusion cavity and the covering member including holding means associated with the openings for securing optical fibers contained in the optical fiber splice element in the closed position.

14. An optical fiber splice element comprising:

a base member for housing optical fibers for fusion within, the base member including an integral fusion member located centrally therewithin and a groove extending outwardly from each side of the fusion element for accommodating and supporting the optical fibers, the fusion member having electrodes bonded thereto; and, a covering member for covering and forming an enclosure with the base member in a closed position, the enclosure remaining with fused optical fibers after fusion to provide a rigid support and strain relief for the fused optical fibers, the covering member and the base member having a latch assembly to maintain closure in the closed position, the covering member including protrusions extending from the covering member and at least partially extending into the groove defined in the base member for securing optical fibers contained within when the enclosure is in the closed position.

* * * * *